(12) United States Patent
Speight

(10) Patent No.: US 8,320,250 B2
(45) Date of Patent: Nov. 27, 2012

(54) METHOD AND ARRANGEMENT FOR TCP FLOW CONTROL

(75) Inventor: Timothy James Speight, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 444 days.

(21) Appl. No.: 12/030,185

(22) Filed: Feb. 12, 2008

(65) Prior Publication Data

US 2009/0201813 A1  Aug. 13, 2009

(51) Int. Cl.
*G01R 31/08* (2006.01)
*G06F 11/00* (2006.01)
*G08C 15/00* (2006.01)

(52) U.S. Cl. ....................................................... 370/235

(58) Field of Classification Search ................... 370/231
See application file for complete search history.

(56) References Cited

U.S. PATENT DOCUMENTS

| | | | | |
|---|---|---|---|---|
| 5,519,699 | A * | 5/1996 | Ohsawa | 370/231 |
| 7,743,160 | B2 * | 6/2010 | Li et al. | 709/230 |
| 2003/0048751 | A1 * | 3/2003 | Han et al. | 370/231 |
| 2003/0235206 | A1 * | 12/2003 | Heller | 370/467 |
| 2005/0135250 | A1 * | 6/2005 | Singh et al. | 370/235 |

FOREIGN PATENT DOCUMENTS

| | | |
|---|---|---|
| EP | 1 959 693 | 8/2008 |
| WO | WO-02/067599 A1 | 8/2002 |
| WO | WO-02/067599 C1 | 8/2002 |
| WO | WO-03/069870 A2 | 8/2003 |
| WO | WO-03/069870 A3 | 8/2003 |

OTHER PUBLICATIONS

Cross-Layer error control optimization in 3G LTE,IEE, pp. 2525-2529, Nov. 26-30, 2007,Dzmitry Kliazovich and Fabrizio Granelli.*
Dzmitry Kliazovich and Fabrizio Granelli, Cross-Layer error control optimization in 3G LTE,pp. 2525-2529,Nov. 2007.*
International Search Report Dated Jun. 23, 2009 from PCT/EP2009/051195.
Dzmitry Kliazovich and Fabrizio Granelli; Cross-Layer Error Control Optimization in 3G LTE; (Nov. 1, 2007) DIT—University of Trento; 5 pages.
U.S. Appl. No. 12/042,259, filed Mar. 4, 2008, by Speight et al.
International Preliminary Report on Patentability dated Aug. 17, 2010 from PCT Patent Application No. PCT/EP2009/051195.

* cited by examiner

*Primary Examiner* — Mark Rinehart
*Assistant Examiner* — Maharishi Khirodhar

(57) ABSTRACT

A communication entity is located at one end of a high latency communication link to support Transmission Control Protocol (TCP) communications between a first transceiver entity and a second transceiver entity. The communication entity comprises proxy logic arranged to inspect a received segment and, in response to identifying that the received segment does not contain data, the proxy logic transparently allows a plurality of synchronizing segments to pass between the first transceiver entity and the second transceiver entity through the proxy logic such that the proxy logic generates locally at least one acknowledgement message based on the synchronizing segments and the inspected received segment.

33 Claims, 11 Drawing Sheets

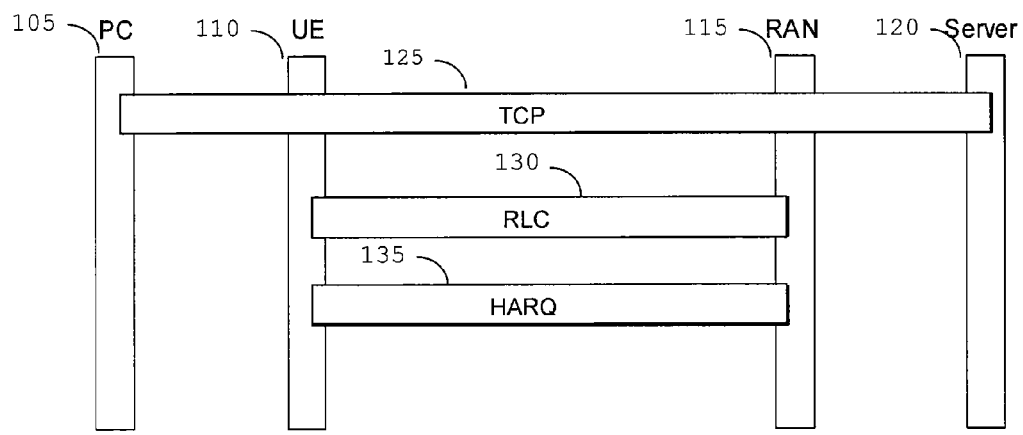
FIG. 1 - PRIOR ART
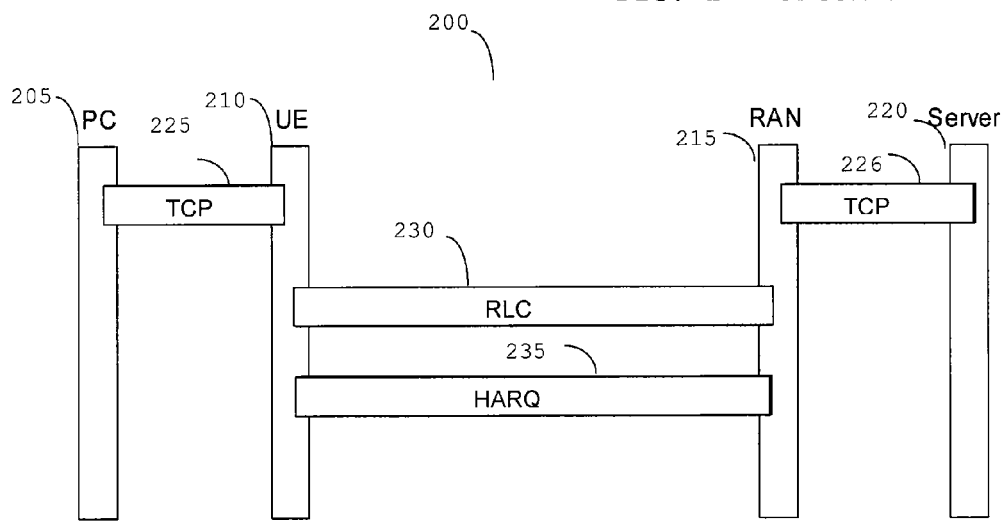
FIG. 2 - PRIOR ART

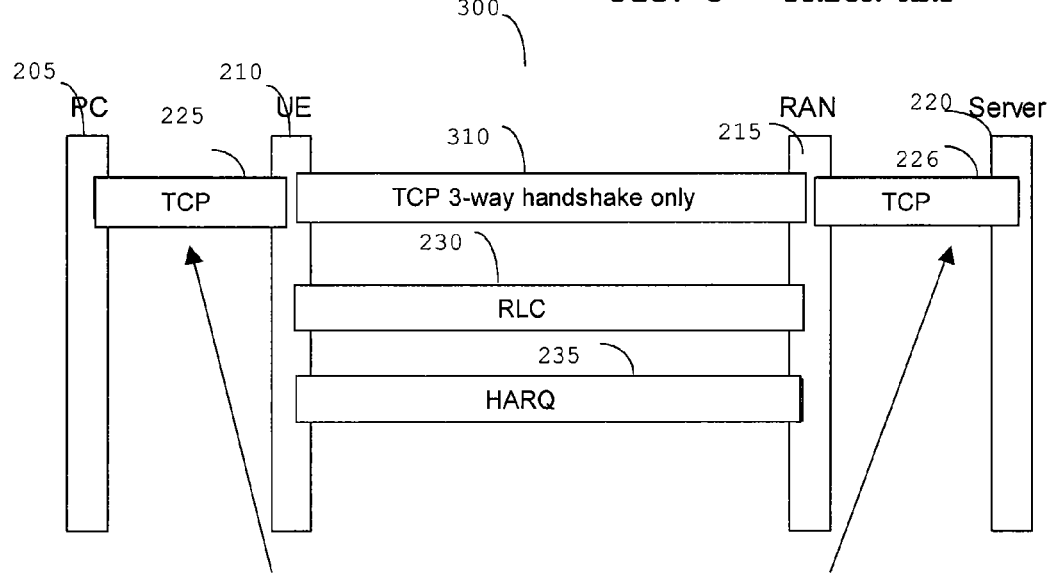
FIG. 3 - PRIOR ART

METHOD AND ARRANGEMENT FOR TCP FLOW CONTROL

FIELD OF THE INVENTION

This invention relates to TCP (Transmission Control Protocol) flow control, and particularly, though not exclusively, to TCP flow control in wireless communication systems.

BACKGROUND OF THE INVENTION

Transmission Control Protocol (TCP) is a protocol in the well-known TCP/IP (Internet Protocol) suite of communication protocols (see [RFC 793] for a full description of the TCP protocol). TCP provides a connection-orientated, reliable, byte stream service and was originally designed for wired networks that have very low error rates.

TCP operates a window based flow control mechanism that limits the amount of unacknowledged data that the sender transmits. This limit is based on a minimum of the congestion window (cwnd) and an advertised window (awnd). The congestion window is controlled by the sender of TCP data and is based on the well known slow start and congestion avoidance mechanisms. Slow start acts to slowly increase the amount of unacknowledged data in the system at the start of a TCP flow and congestion avoidance halves the amount of unacknowledged data in the system when a missing packet is detected and then slowly increases the unacknowledged data back again to its normal flow level. The awnd is controlled based on the receiver's ability to process more data. The initial value of 'awnd' is controlled by parameters configured in the TCP protocol stack.

As mentioned above, TCP is designed for low error rate networks. Therefore any packet losses that occur in TCP-based commmunication networks are considered as being due to network congestion and are therefore followed by a reduction in 'cwnd' and, consequently, in the data rate of the sender, as mentioned above.

However, this is not appropriate to wireless networks that are inherently high error rate systems. Therefore, the 3rd Generation Partnership Project (3GPP) standard provides Automatic Repeat Request (ARQ) functionality, known as Radio Link Control (RLC) (as described in the 3GPP technical specification 3GPP TS 25.322) that allows data packets to be re-transmitted that have been subjected to error as a result of transmission over the air-interface. The reliability of delivering data packets is maintained by a use of RLC acknowledgement messages (ACKs) that are sent by the RLC receiving entity back to the RLC transmitting entity, in response to a predefined trigger. The trigger could be based on, for example, a timer, on receiving a certain number of received packets, or detecting that a packet has been lost. In this manner, lost or corrupted data segments or data packets may be indicated to the transmitter, and these lost or corrupted data segments or data packets may be re-sent. Note also that in later versions of 3GPP (which support HSDPA and E-DCH) an additional retransmission scheme is provided by hybrid automatic request (HARQ) functionality located in the layer-1 (L1) and medium access control (MAC) layers of the well-known OSI protocol.

However, the use of ARQ (and HARQ) schemes result in data packets arriving out of order. Hence, the data packets have to be buffered before they can be passed on for TCP processing. The use of buffering introduces increased delay and this can result in increased RTT (Round Trip Time).

Many wireless data systems have very large air interface throughputs, but also have a high latency, such as the long-term evolution (LTE) being defined by the 3GPP Standards group and the competing WiMax communication standard. Thus, significant problems arise due to the operation of TCP over typical wireless systems. For example, due to the high latency it takes a relatively long time for TCP rates to exploit the high air-interface throughputs and whilst slow start is running the communication link is therefore under utilised. This is particularly an issue when multiple TCP connections are opened for each relatively small object, e.g. when a mobile user is web browsing.

The typical 'awnd' value used in most personal computer (PC) TCP stacks is low (of the order of 8192 bytes). This means that the communication link in high latency wireless systems can never be fully utilised unless the 'awnd' is modified. Typically, the 'awnd' value should be set to the bandwidth delay product of the link. However this only provides a means of allowing the air-interface to be fully exploited for TCP data flows in the downlink (DL) direction, namely from the network to the end-user. In the uplink (UL), namely from the mobile (or fixed) user to the network, the 'awnd' is specified by the server in the network and clearly there is no way this can be altered in a similar fashion. Therefore, with increasingly high UL rates being achievable, the UL TCP rate will, in many circumstances, be limited by the server 'awnd' not the prevailing air-interface conditions.

An additional problem associated with simply increasing the awnd in high latency wireless systems is that any lost data packets due to congestion in the core network causes the DL TCP rate to be badly affected and, due to the high associated latency, a long time to recover. As mentioned previously it is beneficial to use very large awnd values to fully utilise the high data rate high delay air-interface communication link (for example, an 'awnd' value of the order of '100000'). When a lost data packet occurs the 'cwnd' is reduced to half this value. This halved value is typically not enough to fully utilise the communication link, and hence the observed throughput is reduced.

Thus simply increasing the 'awnd' is not an acceptable solution to TCP performance in high latency wireless systems.

Referring now to FIG. 1, a known mechanism for TCP data flow 100 is illustrated. The TCP data flow 100 is arranged between a personal computer (PC) 105, a user equipment (UE) 10, such as a mobile phone, a radio access network (RAN) 115 and a communication server 120. In the known mechanism, TCP ACKs are sent over the air interface. As mentioned previously, a typical TCP network may additionally employ both radio link control (RLC) layer communication 130 and hybrid automatic repeat reQuest (HARQ) 135 error correction over the wireless network between the UE 110 and the RAN 115.

The inventor has both recognised and appreciated that the TCP acknowledgement messages (TCP ACKs) sent over the air-interface are largely unnecessary and are simply a waste of valuable air-interface resources. This is because the underlying RLC and HARQ retransmission schemes (which also employ ACK messages themselves) will ensure that losses in the air interface are corrected, thereby rendering the retransmission functionality of TCP redundant and thus the TCP ACKs do not need to be sent over the air interface. As shown in FIG. 1, three levels of data flow control/re-transmission functionality exist for TCP data packets, which is considered as suboptimal.

Referring now to FIG. 2, a TCP architecture 200 is illustrated that mitigates some of the problems associated with employing TCP over wireless systems. The TCP data flow is arranged between a personal computer (PC) 205, a user equipment (UE) 210, such as a mobile phone, a radio access network (RAN) 215 and a communication server 220. The TCP network architecture employs both radio link control (RLC) layer communication 230 and hybrid automatic repeat reQuest (HARQ) 235 error correction over the wireless network between the UE 210 and the RAN 215.

Notably, this architecture removes the end-to-end TCP connection, by incorporating logic in both the UE 210 and the RAN 215 that performs a TCP proxy function. The result of this is that there is a necessity for some form of flow control at the TCP proxy to exist, to ensure that RLC buffers do not overflow.

Because the end-to-end TCP functionality is removed it is now possible for the IP and TCP header to be completely removed at the proxy and only the underlying data portion of the packet, plus any headers associated with RLC and MAC, is transmitted over the Uu interface. The receiving proxy will then add the TCP header appropriate to the state of the TCP connection that exists at this end of the system.

To clarify the functionality employed in the TCP network architecture 200 in FIG. 2, an example data flow is considered below. If a file transfer protocol (FTP) download of a very large file is initiated, then if the TCP proxy logic at the RAN 215 has no flow control functionality then potentially the whole FTP file will need to be stored in the RNC RLC buffers within the RAN 215. Thus, some method of flow control is needed at the TCP proxy that allows the 'awnd' to be controlled based on the available buffer occupancy at the transmit RLC entity. This is dealt with, in a limited fashion, in known arrangements where a single measure of buffer occupancy is used to determine the 'awnd' value signalled.

A potential problem with this scenario, in known architectures, is that a RLC Move Receiving Window (MRW) command or reset may occur whilst maintaining the connection. A RLC MRW command indicates that the transmitting entity has given up sending a RLC protocol data unit (PDU) and that the receiver must move its window forward so that it skips all RLC PDUs that make up an RLC-SDU. In this circumstance, TCP flow control would previously have provided a final means with which a re-transmission of the lost data segment can occur. Without an overlying TCP protocol, no such retransmission will occur. Furthermore, with totally separate TCP connections at the UE and network ends, it is difficult to provide an additional retransmission scheme to overcome this problem.

Additionally, in flows without end-to-end TCP functionality, potential problems can occur when the UE changes cell, due to the fact that different (i.e. non-synchronised) TCP sessions are occurring at the PC side and the network side.

Referring now to FIG. 3, a data flow control protocol architecture 300 using a known 3-way handshake process is illustrated. The 3-way handshakes 310 are sent through the RAN protocol stack as normal i.e. using RLC/MAC/L1. It is noteworthy that this is different from the case for the full non-end-to-end conventional functionality, as described in FIG. 2. In FIG. 2, two separate 3-way handshakes would occur between the user PC and the UE side and proxy and the server and the network side proxy, where no 3-way handshake would occur over the air interface.

As the 3-way handshake is employed end-to-end, it is now possible to employ TCP proxies at either side of the air interface that are, in effect, 'synchronised'. Hence, although the TCP protocol does not run over the air interface portion of the communication link, it appears from the server and client point of view that the connection is indeed end-to-end.

Hence, an improved mechanism to address the problem of TCP data flow, particularly over a cellular wireless communication network, would be advantageous.

SUMMARY OF THE INVENTION

According to a first aspect of the invention, there is provided a communication entity located at one end of a high latency communication link between a first transceiver entity and a second transceiver entity. The communication entity is arranged to support Transmission Control Protocol (TCP) communications between the first transceiver entity and the second transceiver entity. The communication entity comprises proxy logic arranged to inspect a received segment and, in response to identifying that the received segment does not contain data, the proxy logic transparently allows a plurality of synchronising segments to pass between the first transceiver entity and the second transceiver entity through the proxy logic such that the proxy logic generates locally at least one acknowledgement message based on the plurality of synchronising segments and the inspected received segment.

Aspects of the invention may allow improved use of the communication resource in the communication system, for example by enabling the proxy logic to synchronise both ends of the air interface, without a need to transmit and receive acknowledgement (ACK) or no-acknowledgement (NACK) synchronising messages across the air interface.

Aspects of the invention may allow improved performance as perceived by the end-users, for example by reducing a number of data retransmissions. Aspects of the invention may provide increased throughput rates, for example, due to a reduced number of retransmissions.

According to an optional feature of the invention, the proxy logic may be further arranged to perform re-synchronisation when a subsequent received segment comprises data, wherein the re-synchronisation is based on a sequence number contained in the subsequent received segment.

According to an optional feature of the invention, the proxy logic is further arranged to reject any subsequent received segment that does not comprise data.

According to an optional feature of the invention, the proxy logic further comprises radio link control (RLC) logic arranged to identify a loss of a data segment by determining when at least one of the following occurs: a move receiving window (MRW); a reset. According to an optional feature of the invention, the RLC logic may signal this loss to the proxy logic/functionality. In this manner, standard RLC functionality may be used, in the form of existing MRW and reset commands. The standard functionality is extended with enabling of signalling of these commands to the proxy logic.

According to an optional feature of the invention, the radio link control logic may be operably coupled to buffer logic such that the buffer logic stores received data segments until the RLC logic indicates to the buffer logic that all data segments have been RLC acknowledged (ACked). In this manner, the radio link control logic enables the proxy logic to identify that the RLC has issued, for example, a MRW or reset command. Thus, the proxy logic is able to retransmit the TCP segment associated with this.

In this manner, by examining a radio link control layer message, fast re-transmission of lost packets may be achieved, rather than relying on TCP for re-transmission.

According to an optional feature of the invention, the buffer logic may discard the acknowledged data from its buffers in response to the indication from the RLC logic.

When the communication entity is located on a receive side of the high latency communication link the RLC logic may request missing data to be re-transmitted when all the sequence numbers of data segments have not been successfully received.

According to an optional feature of the invention, when the communication entity is located on a transmit side of the high latency communication link, the RLC logic may be capable of identifying that at least one data segment sent over the high latency communication link has not been acknowledged. In response thereto, the RLC logic may initiate a re-transmission of the unacknowledged RLC data segment from the buffer logic.

According to an optional feature of the invention, the synchronising information may comprise a 3-way handshake. For example, the 3-way handshake may comprise at least one of: a synchronisation indication; a synchronisation acknowledgement indication; and an acknowledgement indication.

According to an optional feature of the invention, the proxy logic may comprise transmit buffer logic and receive buffer logic. The transmit buffer logic and receive buffer logic may be configured to observe maintenance of at least one of the following within the synchronisation segment transparently passed through the communication entity between the transmit entity and the receive entity: a sequence number (SEQ); an acknowledgement (ACK) number; window scaling; a selective acknowledgement; a timestamp.

According to an optional feature of the invention, the proxy logic may be configured to examine a TCP ACK generated by the receiving entity and determine whether the ACK contains no data. If the proxy logic determines that the TCP ACK contains no data, the proxy logic may terminate the TCP ACK and not send the TCP ACK over the air interface.

According to an optional feature of the invention, the proxy logic may be arranged to transmit a TCP ACK back to the transmit entity before the receive entity receives a segment being transmitted.

According to an optional feature of the invention, the communication entity may be one of: a user equipment (UE); and a network entity; arranged to support TCP communication over a 3rd Generation Partnership Project (3GPP) data communication system.

According to a second aspect of the invention, there is provided proxy logic for supporting Transmission Control Protocol (TCP) communications in a communication entity located at one end of a high latency communication link between a first transceiver entity and a second transceiver entity. The proxy logic comprises logic arranged to inspect a received segment and, in response to identifying that the received segment does not contain data, the proxy logic transparently allows a plurality of synchronising segments to pass between the first transceiver entity and the second transceiver entity through the proxy logic; and generates at least one acknowledgement message based on at least one of the plurality of synchronising segments and the inspected received segment.

According to a third aspect of the invention, there is provided a method of providing Transmission Control Protocol (TCP) communications by a communication entity located at one end of a high latency communication link between a first transceiver entity and a second transceiver entity in a data communication system. The method comprises inspecting, by TCP proxy logic, a received segment and, in response to determining that the received segment does not contain data, transparently allowing a plurality of synchronising segments to pass between the first transceiver entity and the second transceiver entity through the proxy logic. The method further comprises generating locally, by the proxy logic, at least one acknowledgement message based on at least one of the plurality of synchronising segments and the inspected received segment.

According to a fourth aspect of the invention, there is provided a computer program product comprising program code for supporting Transmission Control Protocol (TCP) communications by a communication entity located at one end of a high latency communication link between a first transceiver entity and a second transceiver entity in a data communication system. The computer program product comprises program code for inspecting, by TCP proxy logic, a received segment and, in response to determining that the received segment does not contain data, transparently allowing a plurality of synchronising segments to pass between the first transceiver entity and the second transceiver entity through the proxy logic. The computer program product further comprises program code for generating locally, by the proxy logic, at least one acknowledgement message based on at least one of the plurality of synchronising segments and the inspected received segment.

According to a fifth aspect of the invention, there is provided a data communication system comprising a communication entity located at one end of a high latency communication link and supporting Transmission Control Protocol (TCP) communications between a first transceiver entity and a second transceiver entity. The data communication system comprises proxy logic located in the communication entity and arranged to inspect a received segment and, in response to identifying that the received segment does not contain data, the proxy logic transparently allows a plurality of synchronising segments to pass between the first transceiver entity and the second transceiver entity through the proxy logic such that the proxy logic generates locally at least one acknowledgement message based on at least one of the plurality of synchronising segments and the inspected received segment.

These and other aspects, features and advantages of the invention will be apparent from, and elucidated with reference to, the embodiments described hereinafter.

BRIEF DESCRIPTION OF THE DRAWINGS

FIG. 1 illustrates a known TCP flow control protocol architecture.

FIG. 2 illustrates a known data flow control protocol architecture.

FIG. 3 illustrates a known data flow control protocol architecture using a 3-way handshake process.

Figure 4:
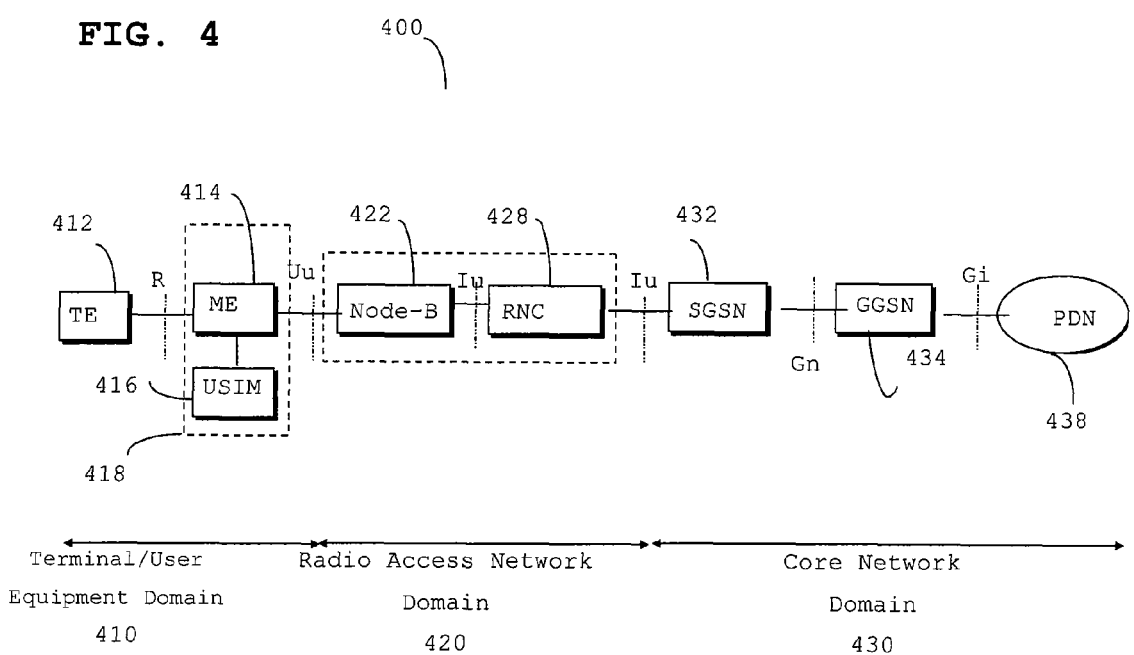

Embodiments of the invention will be described, by way of example only, with reference to the accompanying drawings, in which:

FIG. 4 illustrates a wireless cellular communication network adapted to support embodiments of the invention.

Figure 5:
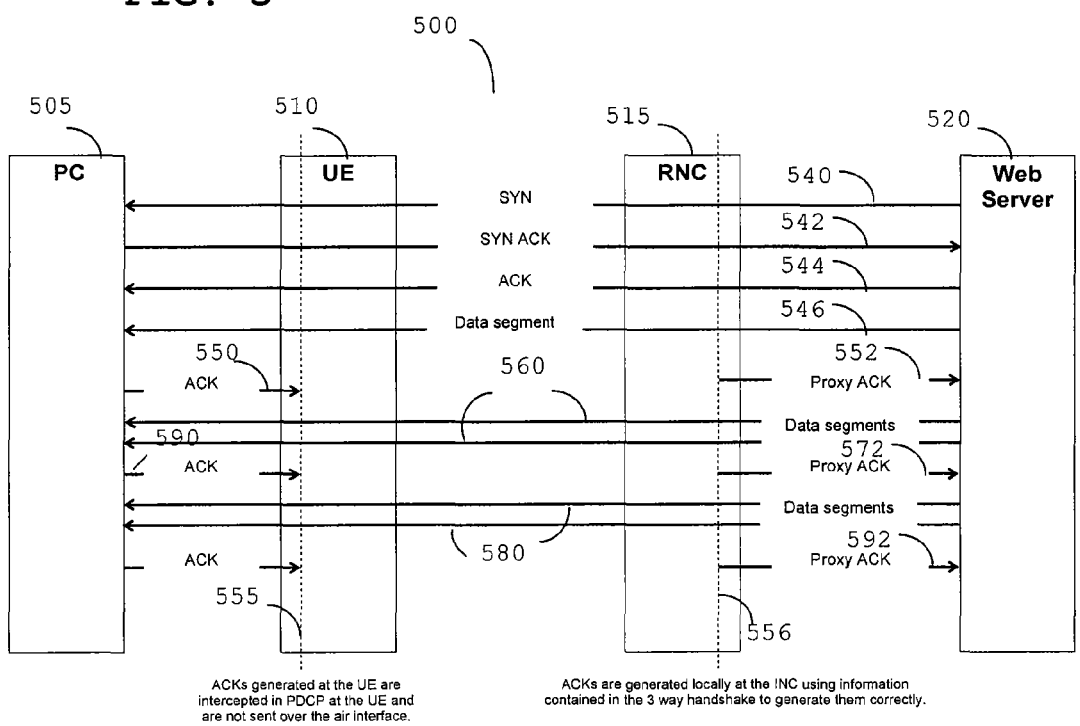

FIG. 5 illustrates a data flow control protocol architecture of a TCP protocol accelerator in accordance with embodiments of the invention.

Figure 6:
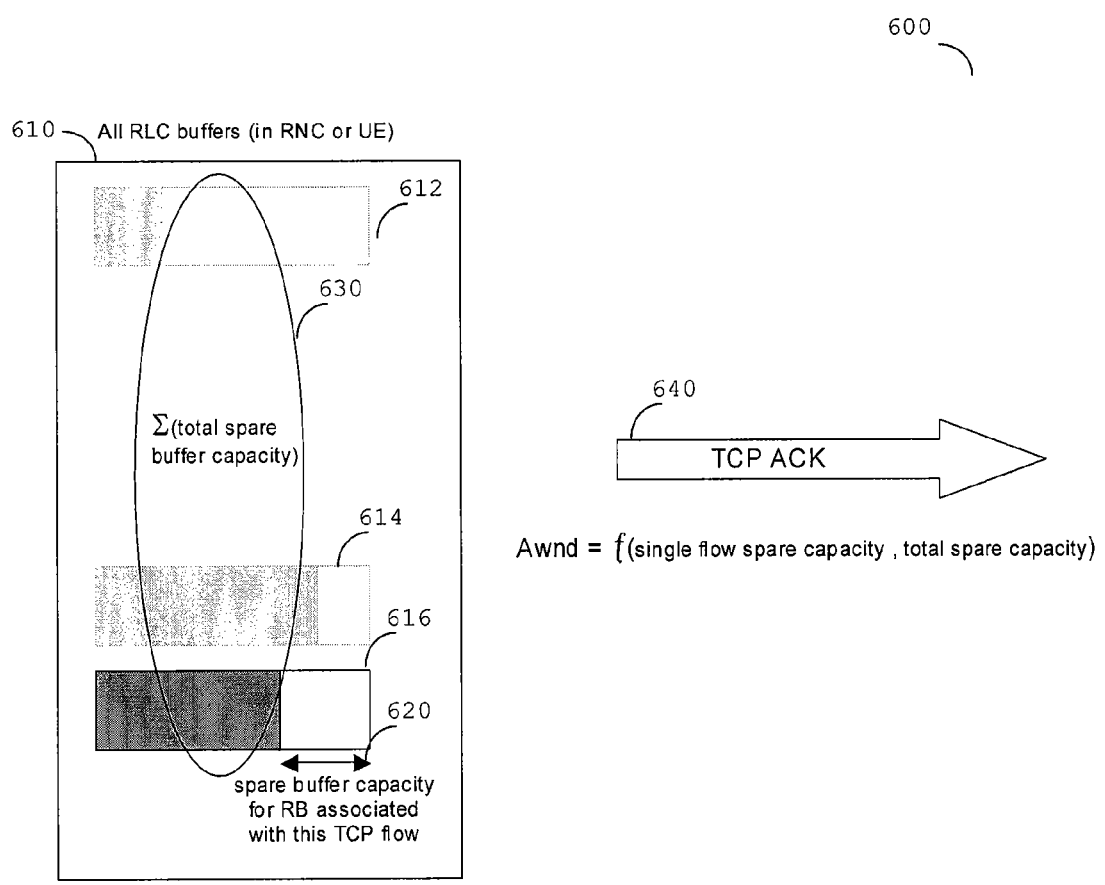

FIG. 6 illustrates an operation of TCP protocol accelerator flow control in accordance with embodiments of the invention.

Figure 7:
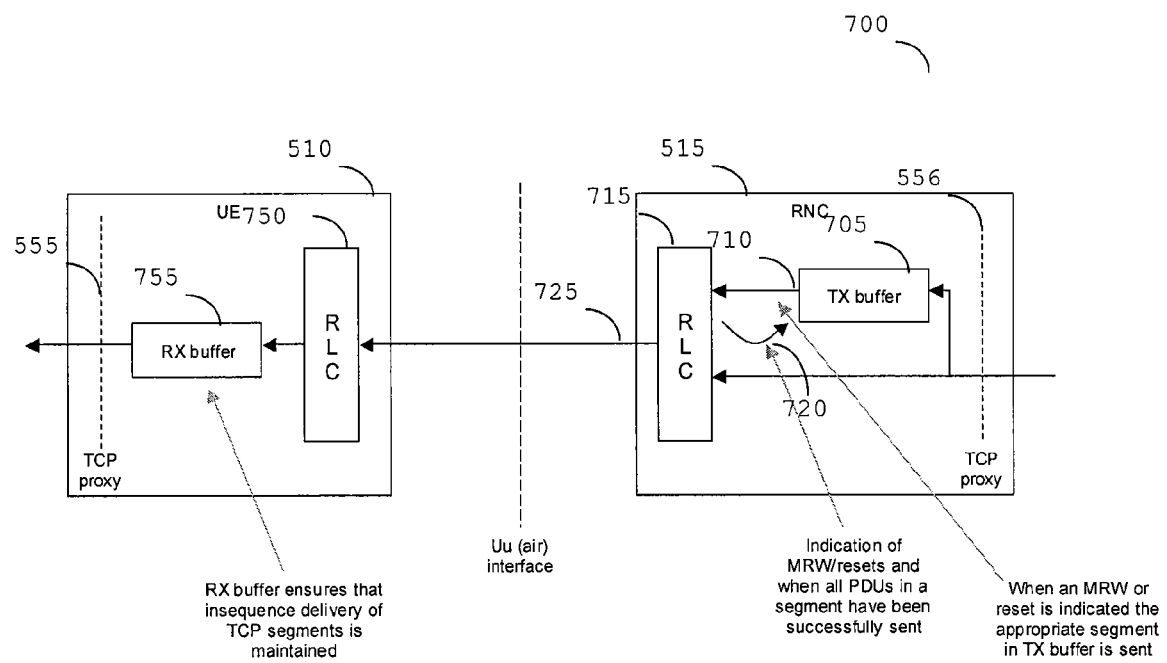

FIG. 7 illustrates the buffer logic functionality that is employed at the both synchronising TCP proxies, in accordance with embodiments of the invention.

Figure 8:
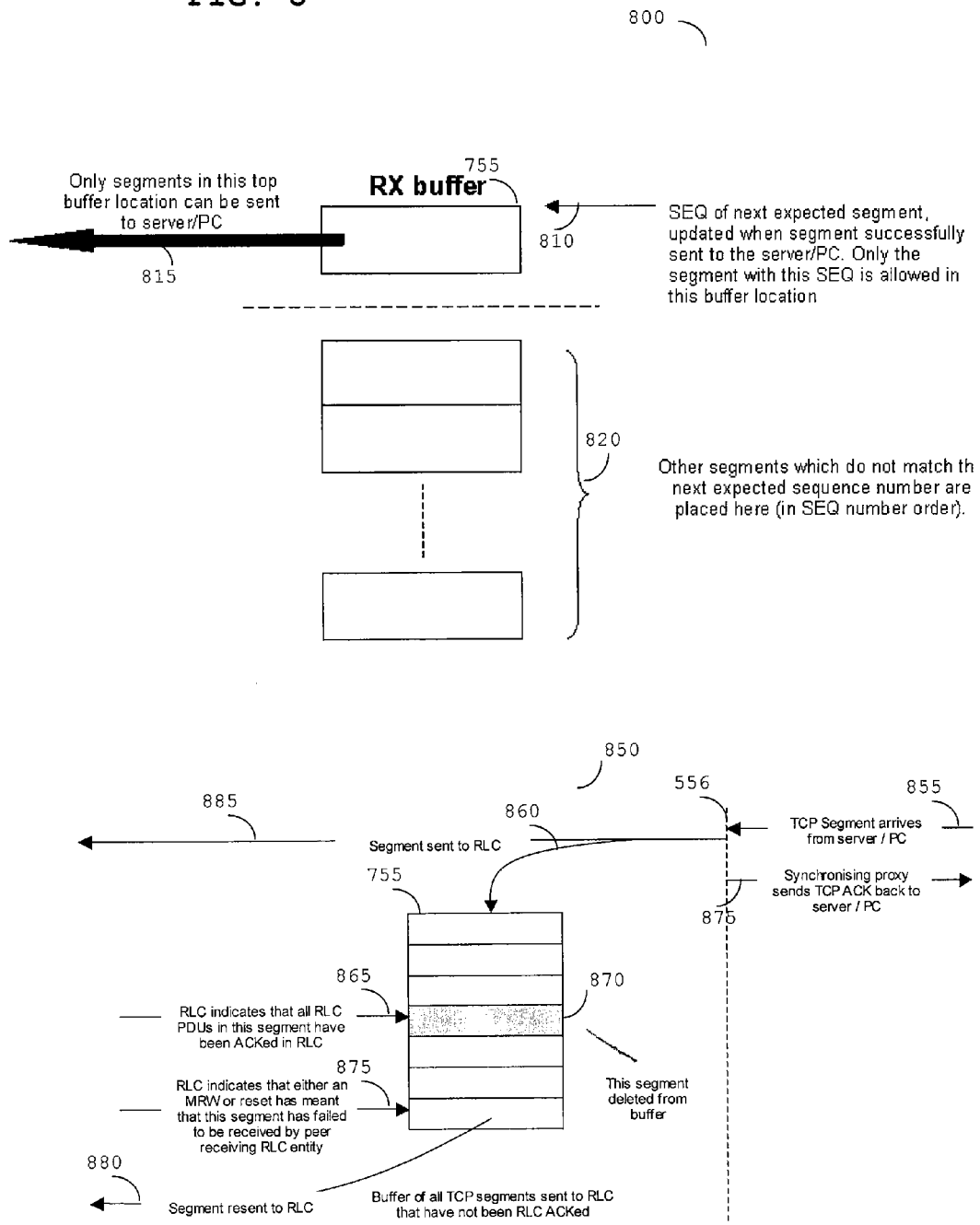

FIG. 8 illustrates the buffer logic functionality that is employed at the transmit and receive sides of the synchronising TCP proxy, in accordance with embodiments of the invention.

Figure 9:
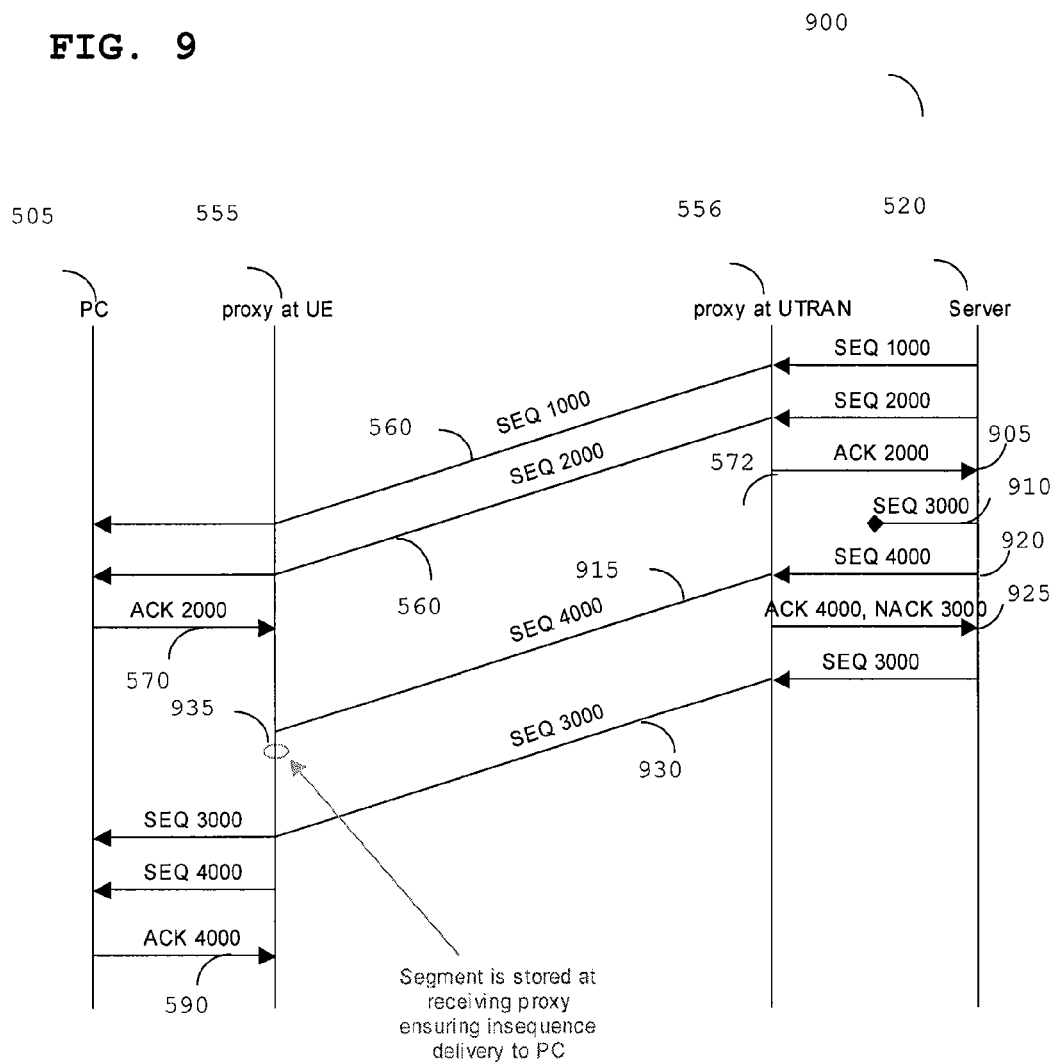

FIG. 9 illustrates an example of an operation of a protocol accelerator when a segment is lost in a core network.

Figure 10:
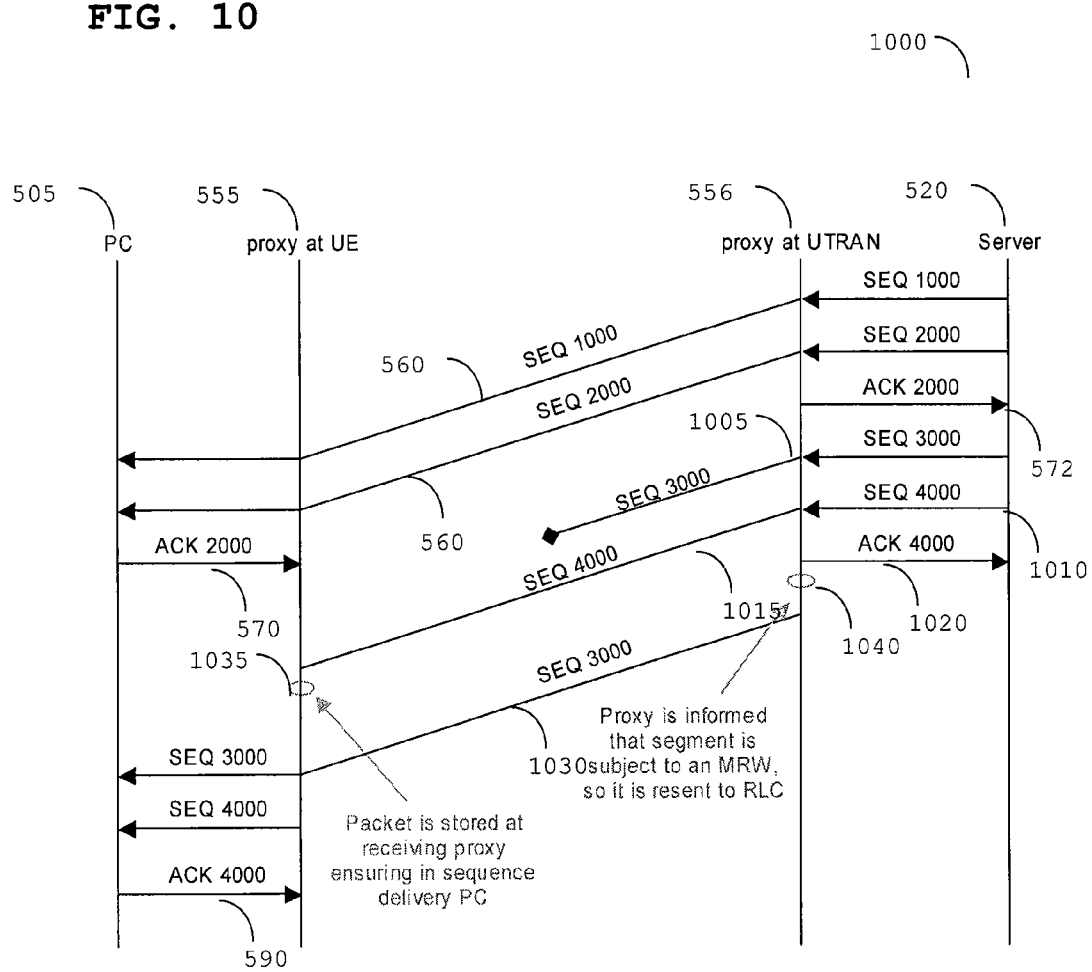

FIG. 10 illustrates an example of an operation of a protocol accelerator when a segment is lost in the RAN, in accordance with embodiments of the invention.

Figure 11:
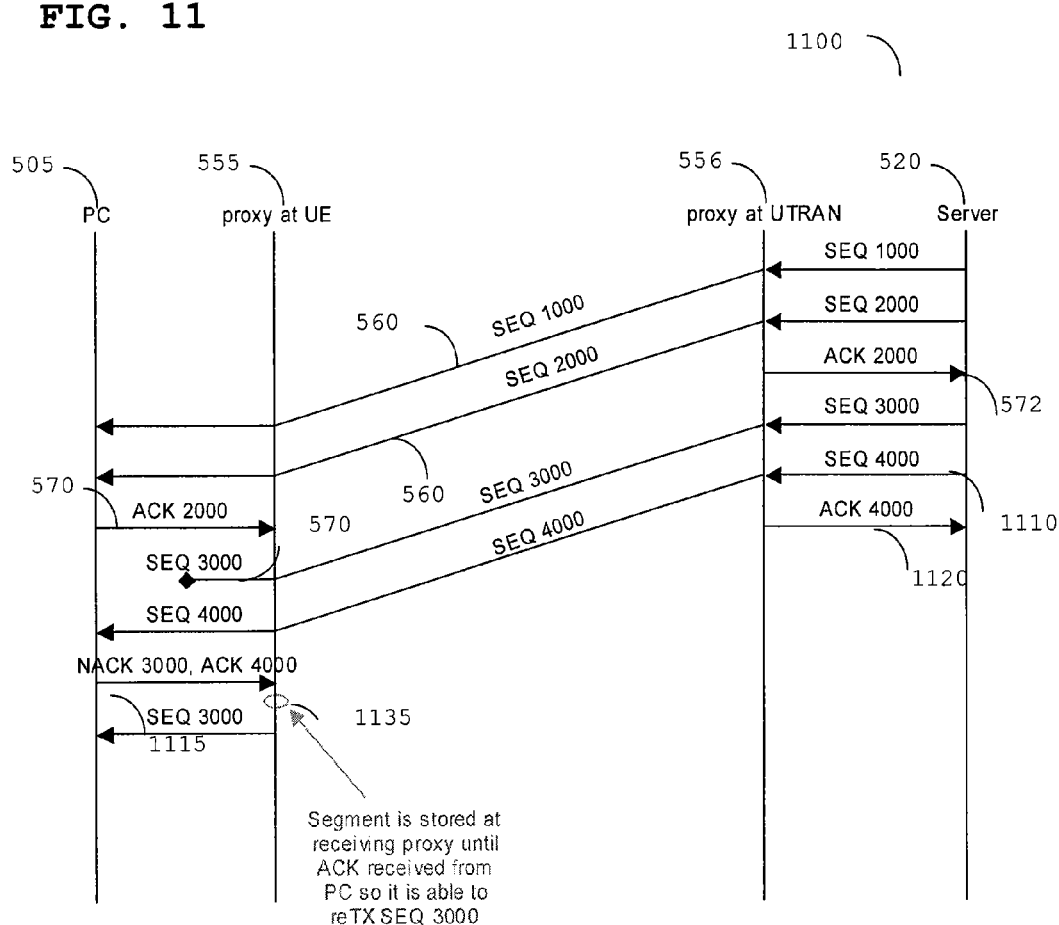

FIG. 11 illustrates an example of an operation of a protocol accelerator when a segment is lost between a UE proxy and a client PC, in accordance with embodiments of the invention.

Figure 12:
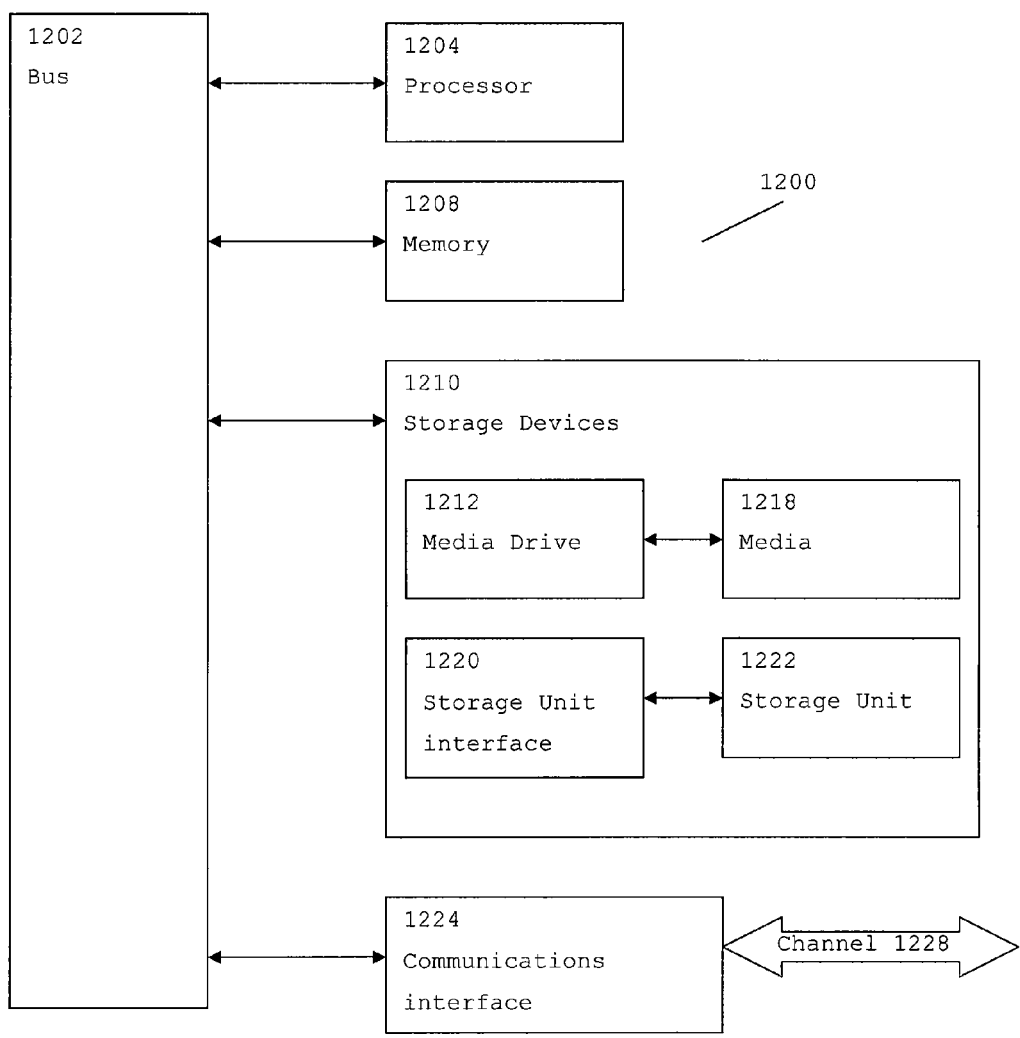

FIG. 12 illustrates a typical computing system that may be employed to implement processing functionality in embodiments of the invention.

DETAILED DESCRIPTION

In accordance with embodiments of the invention, these problems are mitigated by providing a 'synchronising' TCP proxy in both the RAN and the UE. In particular, in the context of the invention, a handshake process, for example the known 3-way handshake, and any segment that contains data is allowed to 'transparently pass through' the 'synchronising' TCP proxy logic. That is to say that they are unmodified in any way and are allowed to continue to the lower layers of the radio access network (at least in the embodiments described below) and ultimately received at the receiving side proxy logic where again it passes through the proxy logic without modification.

Referring first to FIG. 4, a UMTS Radio Access Network (UTRAN) system 400 is conveniently considered as comprising: terminal/user equipment domain 410; a UMTS Terrestrial Radio Access Network domain 420; and an infrastructure domain 430.

In the terminal/user equipment domain 410, terminal equipment (TE) 412 is connected to mobile equipment (ME) 414 via the wired or wireless R interface. The ME 414 is also connected to a user service identity module (USIM) 416; the ME 414 and the USIM 416 together are considered as user equipment (UE) 418. The UE 418 may be for example a remote unit, a mobile station, a communication terminal, or a personal digital assistant. The UE 418 may be coupled to a laptop computer or an embedded communication processor.

The UE 418 communicates packet data with a Node-B (substantially containing functional elements and logic to operate as a base station) 422 in the radio access network domain 420 via the wireless Uu interface. Within the radio access network domain 420, the Node-B 422 communicates with a radio network controller (RNC) 424 via the Iub interface. The RNC 424 communicates with other RNCs (not shown) via the Iur interface.

The Node-B 422 and the RNC 424 together form the UTRAN 426. The RNC 424 communicates with a serving GPRS service node (SGSN) 432 in the core network domain 430 via the Iu interface. Within the core network domain 430, the SGSN 432 communicates with a gateway GPRS support node GGSN 434 via the Gn interface. The GGSN 434 communicates with a public data network 438 via the Gi interface.

Thus, the elements RNC 424, SGSN 432 and GGSN 434 are conventionally provided as discrete and separate units (on their own respective software/hardware platforms) divided across the radio access network domain 420 and the core network domain 430, as shown FIG. 4.

The RNC 424 is the UTRAN element responsible for the control and allocation of resources for numerous Node-Bs 422; typically 50 to 100 Node-Bs may be controlled by one RNC. The RNC also provides reliable delivery of user traffic over the air interfaces. RNCs communicate with each other via the Iur interface. The SGSN 432 is the UMTS Core Network element responsible for Session Control. The SGSN 432 keeps track of a location of an individual UE 418 and performs security functions and access control. The SGSN 432 is a large centralised controller for many RNCs. The GGSN 434 is the UMTS Core Network element responsible for concentrating and tunneling user data within the core packet network to the ultimate destination (e.g., an internet service provider (ISP)). Terminal equipment (TE) 412, such as a personal computer (PC), may be connected to mobile equipment (ME) 414 via the wired or wireless R interface. The ME 414 is also connected to a user service identity module (USIM) 416; the ME 414 and the USIM 416 together are considered as user equipment (UE) 418.

Such a UTRAN system and its operation are described more fully in the 3rd Generation Partnership Project technical specification documents 3GPP TS 45.401, 3GPP TS 43.060, and related documents, available from the 3GPP website at www.3gpp.org, and need not be described herein in more detail.

In accordance with one embodiment of the invention, it is proposed that the architecture in FIG. 4 is adapted to support TCP proxy logic and functionality to exist on both sides of the Uu air-interface, thereby resulting in TCP protocol not being applied over the Uu air-interface. Thus, in one embodiment of the invention, the RNC 224 and UE 218 have been adapted to comprise proxy TCP logic, as described below with respect to FIGS. 5 to 11. In alternative embodiments, for example with respect to an implementation in a 3GPP long-term evolution (LTE) system, the proxy TCP logic may reside in the enhanced eNodeB. A skilled artisan will appreciate that in other systems, the proxy TCP logic may reside in other elements, and therefore the inventive concept is not limited to the specific elements described herein.

Referring now to FIG. 5, a further data flow control protocol architecture of a TCP protocol accelerator is illustrated in accordance with embodiments of the invention. The synchronising TCP proxy in both the UE 510 and the RNC 315 are configured to allow the known 3-way handshake ('SYN' 542, 'SYN ACK' 544 and 'ACK' 546) to transparently pass therethrough, for the end-to-end communication between the PC 505 and, say, a web server 520.

Thus, the information contained within these 'synchronising' TCP messages is then used to synchronise the 'ACK' and 'SEQ' fields in the TCP communication, so that the TCP proxies in the UE 510 and the RNC 515 are able to generate TCP ACKs (and NACKs) that appear to be from the end-point of the entire TCP connection (e.g. they appear to be end-to-end). The known 3-way handshake 540, 542, 544 is followed, in FIG. 5, with the data segment 546, for example being passed in a downlink (DL) scenario from the web server 520 to the PC 505.

Note also that the synchronising functionality of the proxy will extend to inspecting the 3-way handshake for negotiated TCP functionality, such as selective acknowledgements (SACKs in RFC1072) and window scaling (RFC793). These will then be honoured when the proxy generates local ACKs, as discussed in the following section.

As shown in FIG. 5, the proxy functionalities at the network side 556 and UE side 555 allow the 3-way handshake 540, 542 and 546 to pass directly through the proxy (even though they contain no data, as we will see this is not the case for other segments that contain no data). In this example, a download is occurring and when the first TCP segment is sent from the web server 546 it passes directly through the proxies at both the network and UE sides. Note that unlike the conventional TCP proxy functionality described in FIG. 3, the TCP/IP header is not removed (as the TCP in FIG. 3 is completely terminated either side of the air interface). In one example, the TCP/IP header may be compressed, as would be appreciated by a skilled artisan.

When the 3-way handshake is passed through the proxies, the proxies are then able to ensure that any subsequent TCP ACKs that they generate use the appropriate SEQ number, which was negotiated in the 3-way handshake. Additionally any negotiated options, such as window scaling, selective acknowledgments, etc., can also be taken into account when generating ACKs from the proxies. In this manner, a skilled artisan will appreciate that the proxy logic may now be considered as a 'synchronising proxy'.

As soon as the network side proxy allows data segment 546 through the 'synchronising proxy' it sends a TCP ACK 552 back to the server. The ACK is returned in the same manner as a fully functional TCP stack would handle the ACK. Thus, in FIG. 5 the contents of the ACK generated by the TCP proxy at the network 550 are almost exactly the same as that generated by the PC 550.

Possible differences in the contents of the ACK will be the awnd (discussed later), the timestamp field (if this TCP option is enabled) and finally the checksum, which is a product of the entire TCP contents. Hence, if the 'awnd' is different, then the checksum will be different. In this way, the proxy generates what are typically known as 'early ACKs'. However, these have now been properly synchronised so that the system still appears to have end-to-end properties.

The TCP ACK generated by the PC 550 is examined at the proxy at the UE end and since it is determined to contain no data, i.e. it is only a TCP ACK, it is terminated and not sent over the air interface (as the proxy at the network end has already in step 552, ACKed the data segment 546).

It is noteworthy that ACK 552 is received at the server much sooner than the ACK generated by the user PC 550 would have, if the ACK had to traverse the air interface. This results in segment 560 being sent much sooner than would be the case if the proxy logic did not exist. In this manner, throughput performance is increased as the TCP connection is in 'slow-start' for a shorter time and, thus, the RLC buffers are kept full.

Note also that although FIG. 5 illustrates the case for a download, the functionality may be advantageously implemented symmetrically in one embodiment of the invention, so that the proxy functionality also performs in the same manner for uploads.

It is also noteworthy that the proxy logic utilises a modified, but functional, TCP stack, so that it can properly detect when, say, a segment is lost in the core network. As will be appreciated by a skilled artisan, the modification is, in effect, the synchronising and semi-transparent (e.g. letting through the 3-way handshake and data segments) functionality that has been discussed previously. In response thereto, the proxy logic is able to respond with a self-generated TCP ACK (e.g. a negative acknowledgement (NACK)) that requests that the server retransmits the appropriate missing packet. Examples of the operation of the synchronising TCP proxy when segments are lost are presented later.

Referring now to FIG. 6, an operation of TCP protocol accelerator flow control 600 is illustrated in accordance with embodiments of the invention. Here, the flow control is illustrated with regard to the Radio Link Control (RLC) buffers 610, in either the UE or RNC. The conceptual diagram of the RLC buffers 610 show a plurality of buffers 612, 614, 616 partially full with stored data. The spare buffer capacity 630 for each radio bearer (RB) associated with the TCP flow is illustrated in the non-shaded area 620 of each buffer.

An 'awnd' 640 from the particular synchronising TCP proxy is based on a function of the spare buffer occupancy associated with both the individual spare RLC buffer capacity (in turn associated with the RB that this TCP flow is mapped to) and the overall spare RLC buffer capacity associated with all RLC buffers, 612, 614, 616.

Hence, referring back to FIG. 5, when the TCP proxy at the network end sends a TCP ACK 552 to the server, the 'awnd' field that is contained within the ACK is calculated based on the functionality defined in the above paragraph.

In one example, a function for calculating the 'awnd' (although any sensible function is possible) may be of the form:

awnd=Min(initial awnd, Individual free buffer$^\alpha$, Overall free buffer$^\beta$)

The initial 'awnd' is the value negotiated in the 3-way handshake. The values of '$\alpha$' and '$\beta$' may be empirical constant values.

The intention of the TCP protocol accelerator logic is to provide improvements for both uplink (UL) and downlink (DL) TCP traffic. Therefore, both receive and transmit side synchronising TCP proxy functionality is provided at both the UE and in the RAN. In accordance with one embodiment of the invention, the TCP protocol accelerator logic is arranged to reside in PDCP.

A particularly advantageous feature of the aforementioned synchronising proxy is the ability to deal with segments lost in any of the following sections of the network:

(i) The core network, namely between the synchronising proxy at the network end and the server.

(ii) The radio access network, namely to identify losses in the air interface that cannot be corrected by RLC (and/or HARQ functionality).

(iii) The connection between the UE and the PC.

In order to deal with one or more of these three cases the following buffering logic may be provided in embodiments of the invention:

(i) Buffering logic, as described below with respect to FIG. 7 and FIG. 8, at the receiving proxy so that out of sequence segments can be stored until the appropriate missing segment is received so enabling in-sequence delivery of segments to the higher layer. In addition buffering is needed to deal with segments transmitted into the core network (or link between UE and PC) that are lost although this is in inherent in the TCP stack functionality associated with the proxy and is not otherwise considered here.

(ii) Buffering logic may also be provided at the transmitting proxy, so that when an uncorrected loss occurs in the radio access network (for example due to an MRW or reset occurring in RLC, due to persistent errors in the air interface) and is reported to the proxy logic, then the proxy logic is able to re-transmit the segment(s) lost.

Referring now to FIG. 7, the buffer logic functionality 700 that is employed at both synchronising TCP proxies 555, 556 is illustrated in accordance with embodiments of the invention. In FIG. 7, data segments received by the RNC 515 to be sent over the air-interface 725 are input into RLC logic 715. The same data segments are also input to transmit buffer 705, for storing and potentially re-transmitting to the receiving entity, should an 'ACK' not be received by the RNC 515 from the peer RLC entity after a fixed number of attempts to send/re-send the PDUs that make up this segment.

If any one of the PDUs in an SDU reaches the maximum number of times that a RLC PDU is allowed to be re-transmitted, then the RLC logic 715 gives up, sends an MRW and throws away all PDUs that make up the SDU.

When an MRW or reset is indicated to the RNC 515, the appropriate data segment in the transmit buffer 705 is sent 710. When the RLC logic 715 receives an indication of MRW/resets and when all PDUs in a segment have been successfully sent 720, the RLC logic 715 informs the transmit buffer 705 to allow stored segments (that are waiting to be potentially re-transmitted) to be deleted.

On the other side of the air-interface 725, the UE 510 comprises RLC logic 750 for receiving the data segments from the RNC 515 and forwards these received data segments to receive buffer logic 755. The UE 510 also comprises TCP proxy logic 555, as shown. In one embodiment of the invention, the receive buffer logic 755 may be operably coupled to re-ordering logic (not shown) and is primarily introduced in order to allow the UE receive buffer logic 755 to be configured to ensure in-sequence delivery to the TCP end point.

One operation of the architecture of FIG. 7 is based on maintenance of a next-expected TCP sequence number, as implemented by the receiver buffer logic 755. In one embodiment of the invention, this will be maintained as follows:

i. The initial value for the TCP sequence number may be set based on the value negotiated in the 3-way handshake.

ii. Whenever a segment is sent out of receiver buffer logic 755 to the server (or PC), the next expected sequence number is increased by the size of the TCP data in this segment.

An exemplary embodiment of the invention utilises receive buffer logic 755 of the form shown in FIG. 8. The features of this receive buffer logic 755 may track the following rules:

(i) When segments are received they are placed in the receive buffer logic 755 based on the SEQ of the segment in the following manner:
 a. If they match the next expected sequence number they are placed at the head of the buffer 810.
 b. If they do not match the next expected sequence number they are buffered separately in SEQ order 820.

(ii) When a segment occupies the head of the buffer it shall be sent 815 to the server (or PC).

(iii) When the head of the buffer is empty, the rest of the buffer will be searched to see if a segment can be placed at the head of the buffer (the next expected segment number having been updated).

Note that the operation of this buffer logic functionality involves transmission of the TCP sequence number (or a compressed version thereof) over the air interface. Again, it is reiterated that unlike the architecture in FIG. 3 these embodiments do carry TCP header (or at least compressed TCP headers) over the air interface even though the TCP protocol does not actually operate and is terminated at the respective proxies.

The transmit synchronising proxy also comprises logic to provide early ACKs to the transmitting TCP end point (at either the user PC or server). Hence, if the RLC entity fails to send a segment (say, due to repeated failures in the air interface) then the synchronising proxy is arranged to retransmit the segment (noting that the TCP end point clearly can not re-transmit the segments as it has been ACKed).

FIG. 8 further illustrates the buffer functionality that is employed at the transmit side 850 of the synchronising TCP proxy, in accordance with embodiments of the invention. Every TCP segment 855 that enters the transmit side of the TCP proxy 556 will be stored in transmit buffer logic 755. As shown in FIG. 8, a TCP ACK 875 is generated, in the manner as described previously with respect to FIG. 5.

A segment 870 is removed/deleted from this transmit buffer logic 755 when there is an indication 865 from transmitting RLC entity that all the PDUs (noting that a segment may comprise multiple RLC PDUs) that make up the segment have been ACKed by a receiving peer RLC entity.

However, if an indication 875 is received from a transmitting RLC entity that a RLC MRW or RLC reset has occurred then all of the segments that have been abandoned by the RLC will be resent 880 to the RLC logic. For example, the transmitting entity stops trying to send a number of RLC PDUs, corresponding to one or many segments, without obtaining an acknowledgment from the receiving RLC entity that they have been received correctly.

Referring now to FIG. 9, an example of the operation of the protocol accelerator when a segment is lost in a core network is illustrated. The network comprises a synchronising TCP proxy 555, 556 in both the UE and the network, with the TCP proxies being configured to allow the known 3-way handshake ('SYN', 'SYN ACK' and 'ACK') to transparently pass therethrough, for the end-to-end communication between the PC 505 and, say, a web server 520.

Thus, the information contained within these TCP messages is then used to ensure that initially the TCP connection is a full end-to-end connection between PC 505 and server 520. The TCP proxies observe the SEQ and ACK numbers used in the 3-way handshake, plus any options negotiated, such as window scaling or selective acknowledgements. In this manner, the TCP proxies ensure that, when proxy generated ACKs or early ACKs are generated, they match (as close as is possible) the ACK that the actual end point of the TCP connection would have generated.

Thus, and advantageously, as far as the server and PC are concerned the TCP connection still appears to be an end-to-end link, even though TCP is, in effect, no longer running over the air interface portion of the connection.

In this example, we assume that the 3-way handshake has already occurred and the proxies are fully synchronised.

As illustrated, the 'SEQ 1000' and 'SEQ 2000' are sent from the web server 520 to the PC 505. We assume that the well-known delayed ACK functionality is operating, so that typically the TCP ACK is sent every other TCP segment. Thus, after the segment with SEQ2000 is seen at the network side proxy 556, a TCP ACK is generated 572 that acknowledges the correct reception of both the segment with SEQ1000 and the segment with SEQ2000. The network side proxy 556 allows these segments to be sent to lower layers in the radio access network and they are subsequently sent through the proxy at the UE 555 to PC 505. An ACK is generated by the PC 570. However, this ACK is discarded at the proxy at the UE 555, as the segments have already been acknowledged by the proxy generated ACK 572.

On receipt of the proxy generated ACK 572 the server sends two more segments 905 with SEQ3000 and 910 with SEQ4000. As indicated in this example, the segment with SEQ3000 is lost in the core network. The proxy at the network reacts in the normal way, as defined by the operation of the TCP stack, and responds with a TCP ACK 920 that acknowledges receipt of segment with SEQ4000, but additionally indicates that the SEQ3000 has not been received (note that this assumes that selective acknowledgements have been negotiated in the 3-way handshake).

Meanwhile the segment with SEQ4000 is sent through the proxy at the network as normal, and is received at the proxy at the UE at point 935. However, the functionality described in FIG. 9 means that this segment is not passed to the PC 505, but is buffered.

On receipt of TCP ACK 920 the server retransmits the segment with SEQ3000, in step 925. This is then sent through the network side proxy and eventually reaches the proxy logic at the UE. The buffering/reordering logic described in FIG. 9 ensures that the segment with SEQ3000 is sent to the user PC followed by the segment with SEQ4000 (which was previously stored).

The user PC then sends a response 590 that acknowledges reception of segments SEQ3000 and SEQ4000. Advantageously, in-sequence delivery of segments has been maintained. This is then discarded at the proxy at the UE.

In a similar manner to FIG. 9, FIG. 10 illustrates an example of an operation of the synchronising TCP proxy when a data segment 'SEQ 3000' 1005 is lost in the RAN (due, for example, to RLC reaching a maximum number of retransmission attempts for an RLC protocol data unit (PDU) and thus abandoning the entire segment), in accordance with embodiments of the invention.

The proxy at the network acknowledges both segments SEQ3000 and SEQ4000 with response message 1120. Subsequently, the transmitting RLC entity at the network gives up trying to send the segment with SEQ3000 (see 1040), even though it was successful in sending the segment with SEQ4000.

The proxy logic is informed that an MRW has occurred for this segment so it is retransmitted, in message 1030, using the functionality discussed in FIG. 10. At the receiving side proxy at the UE this clearly means that segment with SEQ4000 is received before segment with SEQ3000. However, as in the case discussed in FIG. 9, the buffering and reordering logic discussed in FIG. 9 ensures that segment with SEQ4000 is stored at point 1035.

Once the segment with SEQ3000 is received at the proxy at the UE then it is sent to the user PC followed by the stored segment with SEQ4000.

In a similar manner to FIG. 9 and FIG. 10, FIG. 11 illustrates an example of an operation of the protocol accelerator when a data segment 'SEQ 3000' 1105 is lost between the UE proxy logic 555 and a client PC 505, in accordance with embodiments of the invention.

Here, the standard TCP stack functionality associated with the proxy at the UE ensures that if a segment is lost between the proxy at the UE and the users PC that when the user PC 505 sends a TCP ACK that indicates the segment with SEQ3000 has not been received, but the segment with SEQ4000 has been successfully received in message 1135, the proxy responds by retransmitting the segment with SEQ3000.

Notably, as the aforementioned examples illustrate, the additional logic introduced into the proxy logic at both ends of the air interface ensure that a TCP ACK is returned to the sender from the proxy, when a loss is identified, before the actual receiving end point has actually received this segment.

Although one embodiment of the invention describes a concept of using proxy logic at both ends of the air-interface for a 3GPP network, in other examples the inventive concept may be applied to any other communication system employing TCP, such as the future 3GPP long term evolution (LTE) system.

Embodiments of the invention aim to provide one or more of the following advantages:

(i) Use of an RLC for fast re-transmission of lost packets, rather than relying on TCP for re-transmission functionality.

(ii) Use of proxy logic at both ends of the air-interface removes a need to transmit and receive ACK, NACK synchronising messages.

FIG. 12 illustrates a typical computing system 1200 that may be employed to implement processing functionality in embodiments of the invention. Computing systems of this type may be used in Node-Bs (in particular, the scheduler of the Node-B), core network elements, such as the GGSN, and RNCs, for example. Those skilled in the relevant art will also recognize how to implement the invention using other computer systems or architectures. Computing system 1200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1200 can include one or more processors, such as a processor 1204. Processor 1204 can be implemented using a general or special-purpose processing engine such as, for example, a microprocessor, microcontroller or other control logic. In this example, processor 1204 is connected to a bus 1202 or other communications medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory (ROM) or other static storage device coupled to bus 1202 for storing static information and instructions for processor 1204.

The computing system 1200 may also include information storage system 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having stored therein particular computer software or data.

In alternative embodiments, information storage system 1210 may include other similar components for allowing computer programs or other instructions or data to be loaded into computing system 1200. Such components may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1218 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a universal serial bus (USB) port), a PCMCIA slot and card, etc. Software and data transferred via communications interface 1224 are in the form of signals which can be electronic, electromagnetic, and optical or other signals capable of being received by communications interface 1224. These signals are provided to communications interface 1224 via a channel 1228. This channel 1228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1208, storage device 1218, or storage unit 1222. These and other forms of computer-readable media may store one or more instructions for use by processor 1204, to cause the processor to perform specified operations. Such instructions, generally referred to as 'computer program code' (which may be grouped in the form of computer programs or other groupings), when executed, enable the computing system 1200 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1200 using, for example, removable storage drive 1212, drive 1212 or communications interface 1224. The control logic (in this example, software instructions or computer program code), when executed by the processor 1204, causes the processor 1204 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A communication entity located at one end of a high latency communication link between a first transceiver entity and a second transceiver entity, the communication entity comprising:
    a processor;
    communication logic for supporting Transmission Control Protocol (TCP) communications between the first transceiver entity and the second transceiver entity, proxy logic for inspecting a received segment, wherein each of the communication logic and the proxy logic is embodied as hardware, as a series of operating instructions configured to direct operation of the processor or as a combination thereof, wherein the proxy logic is operable, in response to identifying that the received segment does not contain data, to transparently allow a plurality of synchronising segments comprising a 3-way handshake to pass between the first transceiver entity and the second transceiver entity through the proxy logic for all TCP connections observed by the proxy logic, and the proxy logic is further operable to generate locally at least one acknowledgement (ACK) message based on the plurality of synchronising segments and the received segment and transmit the at least one ACK message prior to receiving acommunication from the second transceiver entity, wherein the 3-way handshake comprises:
    a synchronisation indication;
    a synchronisation acknowledgement indication; and
    an acknowledgement indication.

2. The communication entity of claim 1 wherein the proxy logic is further operable to perform re-synchronisation when a subsequent received segment comprises data, wherein the re-synchronisation is based on a sequence number contained in the subsequent received segment.

3. The communication entity of claim 2 wherein the proxy logic is further operable to reject any subsequent received segment that does not comprise data.

4. The communication entity of claim 1 wherein the high latency communication link is an air interface of a wireless data communication system.

5. The communication entity of claim 1 wherein the proxy logic further comprises radio link control logic for identifying a loss of a data segment by determining when at least one of the following occurs:
    a move receiving window (MRW); or
    a reset.

6. The communication entity of claim 5 wherein the radio link control logic is operably coupled to buffer logic, and the buffer logic is operable to store received data segments until the radio link control logic indicates to the buffer logic that all data segments have been radio link control (RLC) layer acknowledged.

7. The communication entity of claim 6 wherein the buffer logic is operable to discard the acknowledged data from the buffer logic's buffers in response to the indication from the radio link control logic.

8. The communication entity of claim 5, wherein the communication entity is located on a receive side of the high latency communication link, and the radio link control logic is operable to buffer the received data segments after a MRW or reset being declared by the radio link control logic.

9. The communication entity of claim 5 wherein the communication entity is located on a transmit side of the high latency communication link, and the radio link control logic is operable to identify that at least one data segment sent over the high latency communication link has been subject to a MRW or reset and so has not been received at the receiving RLC peer entity, and is operable in response thereto to initiate a re-transmission of the unacknowledged RLC data segment from the buffer logic.

10. The communication entity of claim 1 wherein the proxy logic is operable to locally generate a negative TCP acknowledgement (NACK) that is correctly synchronised using the synchronising segments.

11. The communication entity of claim 6 wherein the buffer logic comprises transmit buffer logic and receive buffer logic operable to observe maintenance of at least one of the following within the plurality of synchronisation segments:
   a sequence number (SEQ);
   an acknowledgement (ACK) number;
   window scaling;
   a selective acknowledgement; or
   a timestamp.

12. The communication entity of claim 11 wherein the proxy logic is operable to generate an early ACK message based on the observed maintenance of at least one of the following that would have been substantially generated by a receiving entity in the absence of a proxy:
   a sequence number (SEQ);
   an acknowledgement (ACK) number;
   window scaling;
   a selective acknowledgement; or
   a timestamp.

13. The communication entity of claim 11 wherein the proxy logic is operable to receive an awnd value signaled in an ACK or NACK message based on the window scaling.

14. The communication entity of claim 13 wherein the proxy logic is operable to calculate an awnd value based on buffer occupancy.

15. The communication entity of claim 1 wherein the proxy logic is operable to terminate a TCP ACK and not send the TCP ACK over the high latency communication link in response to the proxy logic determining that the TCP ACK contains no data.

16. The communication entity of claim 1 wherein the proxy logic is operable to transmit a TCP ACK back to a transmit entity before a receiving TCP entity transmits its respective ACK.

17. The communication entity of claim 1, wherein the communication entity is one of:
   a user equipment (UE); or
   a network entity; and
   the communication logic is operable to support TCP communication over a 3rd Generation Partnership Project (3GPP) data communication system.

18. An integrated circuit comprising proxy logic for supporting Transmission Control Protocol (TCP) communications in a communication entity located at one end of a high latency communication link between a first transceiver entity and a second transceiver entity, the proxy logic comprising:
   A processor;
   inspection logic for inspecting a received segment, wherein the inspection logic is operable to, in response to identifying that the received segment does not contain data, transparently allow a plurality of synchronising segments comprising a 3-way handshake to pass between the first transceiver entity and the second transceiver entity through the proxy logic for all TCP connections observed by the proxy logic;
   acknowledgement logic for generating at least one acknowledgement message based on at least one of the plurality of synchronising segments and the received segment, wherein each of the inspection logic and the acknowledgement logic is embodied as hardware, as a series of operating instructions configured to direct operation of the processor or as a combination thereof, wherein the proxy logic is operable, in response to identifying that the received segment; and a transmitter for transmitting the at least one acknowledgement message prior to receiving a communication from the second transceiver entity, wherein the 3-way handshake comprises:
   a synchronisation indication;
   a synchronisation acknowledgement indication; and
   an acknowledgement indication.

19. A computer-enabled method of providing Transmission Control Protocol (TCP) communications by a communication entity located at one end of a high latency communication link between a first transceiver entity and a second transceiver entity in a data communication system, the method comprising:
   at the communication entity:
   inspecting, by TCP proxy logic, a received segment, said TCP proxy logic embodied as a series of operating instructions configured to direct operation of a processor, as hardware or as a combination thereof;
   in response to determining that the received segment does not contain data, transparently allowing a plurality of synchronising segments to pass between the first transceiver entity and the second transceiver entity through the proxy logic for all TCP connections observed by the proxy logic;
   generating locally, by the proxy logic, at least one acknowledgement message based on at least one of the plurality of synchronising segments and the received segment;
   and transmitting the at least one acknowledgement message prior to receiving a communication from the second transceiver entity, wherein the plurality of synchronising segments comprises a 3-way handshake, and the 3-way handshake comprises:
   a synchronisation indication;
   a synchronisation acknowledgement indication; and
   an acknowledgement indication.

20. The method of claim 19, further comprising:
   performing re-synchronisation in response to a subsequent received segment comprising data, wherein the re-synchronisation is based on a sequence number contained in the subsequent received segment.

21. The method of claim 19, further comprising:
   rejecting any subsequent received segment that does not comprise data.

22. The method of claim 19, further comprising:
   locally generating a negative TCP acknowledgement (NACK) that is correctly synchronised using the synchronising segments.

23. The method of claim 19, further comprising:
   generating an early ACK message based on the observed maintenance of at least one of the following that would have been substantially generated by a receiving entity in the absence of a proxy:
   a sequence number (SEQ);
   an acknowledgement (ACK) number;
   window scaling;
   a selective acknowledgement; or
   a timestamp.

24. The method of claim 19, further comprising:
terminating a TCP ACK and not send the TCP ACK over the high latency communication link in response to determining that the TCP ACK contains no data.

25. The method of claim 19, further comprising:
transmitting a TCP ACK back to a transmit entity before a receiving TCP entity transmits its respective ACK.

26. A non-transitory computer program product having executable program code stored thereon for supporting Transmission Control Protocol (TCP) communications by a communication entity located at one end of a high latency communication link between a first transceiver entity and a second transceiver entity in a data communication system, the program code operable for, when executed at the communication entity:
inspecting, by TCP proxy logic, a received segment;
in response to determining that the received segment does not contain data, transparently allowing a plurality of synchronising segments to pass between the first transceiver entity and the second transceiver entity through the proxy logic for all TCP connections observed by the proxy logic; and
generating locally, by the proxy logic, at least one acknowledgement message based on at least one of the plurality of synchronising segments and the received segment, wherein the plurality of synchronising segments comprises a 3-way handshake, and the 3-way handshake comprises:
a synchronisation indication;
a synchronisation acknowledgement indication; and
an acknowledgement indication.

27. The non-transitory computer program product of claim 26, further comprising instructions for:
performing re-synchronisation in response to a subsequent received segment comprising data, wherein the re-synchronisation is based on a sequence number contained in the subsequent received segment.

28. The non-transitory computer program product of claim 26, further comprising instructions for:
rejecting any subsequent received segment that does not comprise data.

29. The non-transitory computer program product of claim 26, further comprising instructions for:
locally generating a negative TCP acknowledgement (NACK) that is correctly synchronised using the synchronising segments.

30. The non-transitory computer program product of claim 26, further comprising instructions for:
generating an early ACK message based on the observed maintenance of at least one of the following that would have been substantially generated by a receiving entity in the absence of a proxy:
a sequence number (SEQ);
an acknowledgement (ACK) number;
window scaling;
a selective acknowledgement; or
a timestamp.

31. The non-transitory computer program product of claim 26, further comprising instructions for:
terminating a TCP ACK and not send the TCP ACK over the high latency communication link in response to determining that the TCP ACK contains no data.

32. The non-transitory computer-readable medium of claim 26, further comprising instructions for:
transmitting a TCP ACK back to a transmit entity before a receiving TCP entity transmits its respective ACK.

33. A data communication system comprising a communication entity located at one end of a high latency communication link and supporting Transmission Control Protocol (TCP) communications between a first transceiver entity and a second transceiver entity, the data communication system comprising:
a processor;
proxy logic, embodied as a series of operating instructions configured to direct operation of the processor, as hardware or as a combination thereof, located in the communication entity, wherein the proxy logic is operable to inspect a received segment and further operable to, in response to identifying that the received segment does not contain data, transparently allow a plurality of synchronising segments to pass between the first transceiver entity and the second transceiver entity through the proxy logic for all TCP connections observed by the proxy logic, wherein the proxy logic is further operable to generate locally at least one acknowledgement message based on at least one of the plurality of synchronising segments and the received segment and transmit the at least one acknowledgement message prior to receiving a communication from the second transceiver entity, wherein the plurality of synchronising segments comprises a 3-way handshake, and the 3-way handshake comprises:
a synchronisation indication;
a synchronisation acknowledgement indication; and
an acknowledgement indication.

* * * * *